Oct. 5, 1948.  V. C. SMITH ET AL  2,450,527
SEMIAUTOMATIC COUPLING
Filed Oct. 27, 1945  2 Sheets-Sheet 1
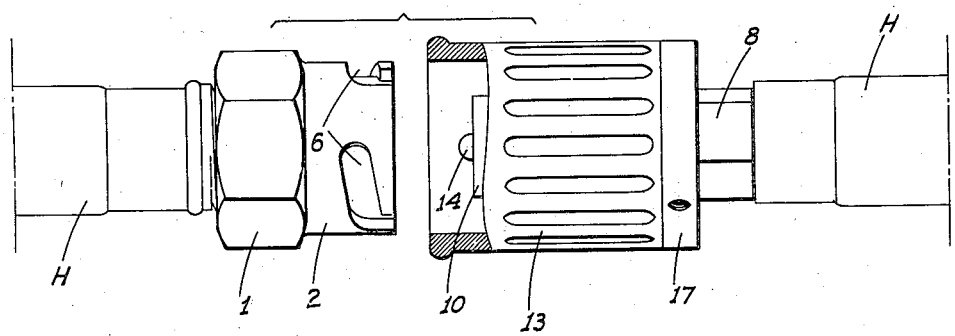
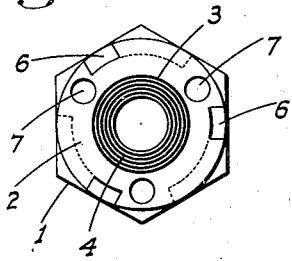
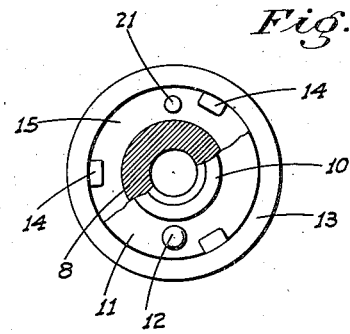
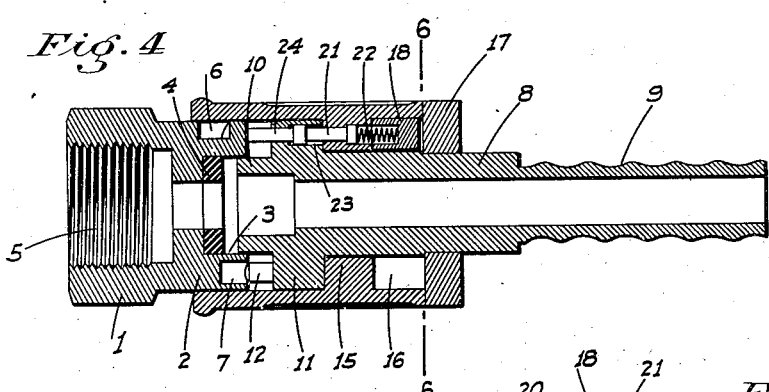
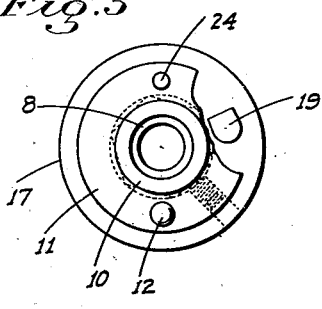
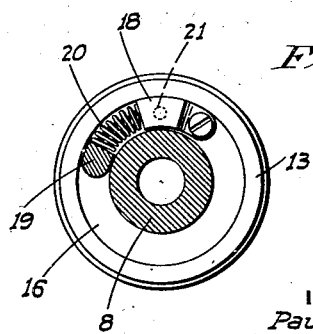
INVENTORS
Paul E. Bohn
Vernon C. Smith
BY
ATTORNEYS

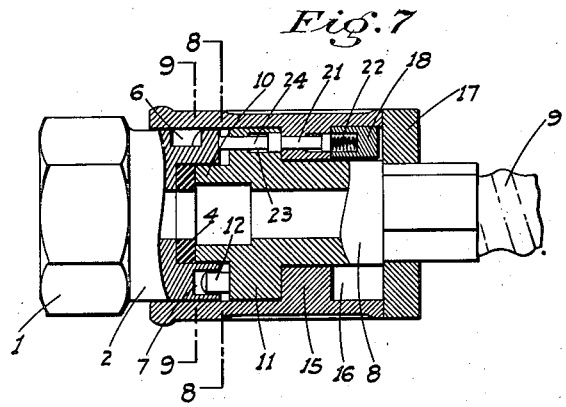
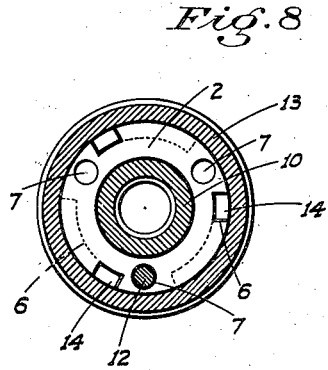
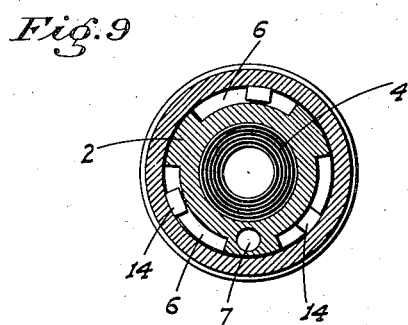
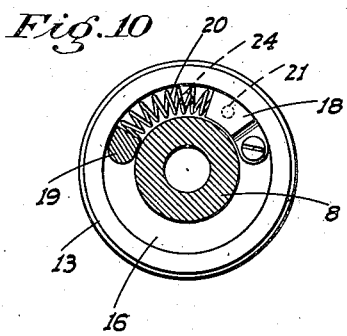
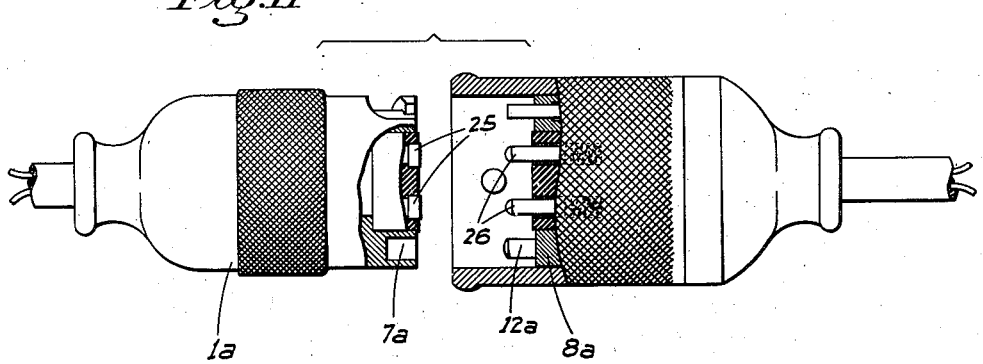
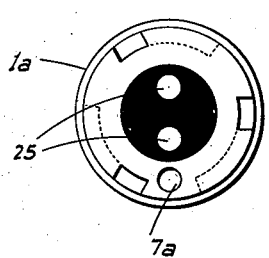

Patented Oct. 5, 1948

2,450,527

UNITED STATES PATENT OFFICE 2,450,527

SEMIAUTOMATIC COUPLING

Vernon C. Smith, Stockton, and Paul E. Bohn, Angels Camp, Calif., assignors to P. & V. Quicklocking Co., Stockton, Calif., a corporation of California Application October 27, 1945, Serial No. 624,966

5 Claims. (Cl. 285—177)

This invention relates to quick-acting couplings to provide a leak-proof connection for fluid conduits such as hoses, as well as for electric cables.

The present invention particularly represents improvements over the patent to Paul E. Bohn, No. 2,087,180, and while retaining the principle of operation of the structure of said patent, the object now is to provide for a semi-automatic coupling and locking action; the mechanism for this purpose being so arranged that when the spring which controls the rotation of the locking sleeve in a locking direction is first tensioned by hand, it will remain automatically cocked indefinitely until the parts of the coupling are initially brought together. When this action is performed the sleeve is automatically released to cause the parts to be locked together. To perform a coupling operation therefore, it is only necessary to move the parts of the coupling into engagement in end to end direction without having to maintain manual pressure against the spring, as was previously the case. Since the cocking of the sleeve takes place naturally in connection with an uncoupling operation, the members of the coupling are always in position for recoupling without any other operation of manipulation of the sleeve being first necessary.

Also the construction of the coupling as a whole has been simplified from a manufacturing standpoint and arranged so that a leak-proof connection can be made with the use of an ordinary hose washer, which is easily replaceable when necessary.

These objects we accomplish by means of such structure and relative arrangement of parts as will fully appear by a perusal of the following specifications and claims.

In the drawings similar characters of reference indicate corresponding parts in the several views:

Figure 1 is a side elevation of the coupling, showing the members separated and the locking sleeve partly in section.

Figure 2 is an end view of the male member of the coupling.

Figure 3 is an end view of the female member, partly broken away and in section.

Figure 4 is a sectional elevation of the coupling with the members as initially engaged.

Figure 5 is an end view of the inner part of the female member detached and partly broken away.

Figure 6 is a cross section on the line 6—6 of Fig. 4 showing the spring in a tensioned or sleeve-cocking position.

Figure 7 is a sectional elevation of the coupling showing the members as fully engaged but before the sleeve has rotated to a locking position.

Figure 8 is a cross section on the line 8—8 of Fig. 7.

Figure 9 is a cross section on the line 9—9 of Fig. 7, but with the coupling members relatively rotated and locked.

Figure 10 is a cross section similar to Fig. 6 but showing the members as relatively rotated to a locking position.

Figure 11 is a side elevation partly in section of the coupling as arranged for electric cable connection, the members being separated.

Figure 12 is an end elevation of the male member of such coupling.

Referring now more particularly to the characters of reference on the drawings, and particularly at present to Figs. 1 to 10, the male member comprises a tubular body 1 having a cylindrical portion 2 at its forward end.

The body is counterbored as at 3 from said end to a certain depth and a flexible resilient washer 4 is seated in the counterbore. The body at its rear end is tapped as at 5, or otherwise arranged for connection to one end of a hose H. The portion 2 is provided on the outside with a plurality of bayonet slots 6 evenly spaced and sloping spirally in a direction away from their entering end, as shown in Fig. 1. Between the entering ends of the slots said portion 2 is formed with evenly spaced sockets 7 extending axially of the member.

The female member or unit of the coupling comprises a tubular body 8 provided along its rear end portion with rough threads or corrugations as at 9 for securing engagement with another length of hose H. At its front end the body 8 is formed with a cylindrical portion 10 adapted to enter the counterbore 3 and engage the washer 4 in sealing relationship. Just back of said portion 10, the body 8 is formed with a circular enlargement 11, which has a dowel pin 12 projecting axially toward the front end of the body to enter any socket 7.

A sleeve 13 is turnably mounted on the body 8 over the enlargement 11 and extends beyond the portion 10 in overhanging relation thereto. Pins 14 project radially inward from the sleeve adjacent its outer end to enter the bayonet slots 6. Beyond the enlargement 11 the sleeve 13 is formed with a transverse wall 15 projecting radially inward and turnably engaging the adjacent portion of the body 8. A chamber 16 is formed in the sleeve rearwardly of the wall, which is closed by a disc or head 17 secured against rotation and axial movement on the adjacent portion of the body 8; the hose engaging portion 9 projecting beyond said disc. The sleeve is thus free to rotate but cannot move axially on the body 8.

A fixed lug or stop 18 projects into the chamber 16 from the sleeve, while another lug 19, spaced circumferentially from the lug 18, projects into said chamber from the disc 17. A compression spring 20 is disposed between and engages the lugs.

Slidable in the wall 15 and disposed axially of the sleeve is a locking pin 21 which is advanced toward the enlargement 11 by a spring 22. This pin when advanced is adapted to project into a socket 23 formed in the enlargement opposite the pin 12 and when so projected, engages and advances a trigger pin 24 slidably mounted in said enlargement. The pin 24 when thus advanced projects beyond the enlargement to a point adjacent the plane of the forward end of the portion 10, as shown in Fig. 4. When the locking pin is so socketed, the spring 20 is loaded or under compression and the sleeve is cocked. The position of the sleeve relative to the body 8 is then such that if the dowel pin 12 is alined with a socket 7, the pins 14 will aline with the entering ends of the bayonet slots 6.

In operation the members are first alined with each other so that the dowel pin enters a socket 7 to establish non-turning relationship between the male and female body members. Said members are then brought as close together as normal hand pressure will allow, or until the pins 14 enter the bayonet slots and the portion 10 contacts the washer 4. With such movement of the members the trigger pin 24 is pushed back, pushing on the locking pin 21 until the latter clears the socket 23. This releases the sleeve from holding engagement with the body 8, and the spring 20 functions to rotate the sleeve relative to said body. The pins 14 then advance along the bayonet slots and since the latter slope in a spiral direction as described, the bodies of the coupling are drawn closer together and the washer and the adjacent end of portion 10 engage each other with a tight non-leak fit.

To release the coupling it is only necessary to rotate the sleeve in the opposite direction. This retracts the pins 14 from the bayonet slots, again tensions the spring 20, and finally disposes the pin 21 in alinement with the socket 23. The spring pressure against the locking pin causes the same to enter the socket, pushing the pin 24 ahead of it and against the male member of the coupling, and starting the latter out. The sleeve is then again cocked and in proper position for a subsequent coupling operation without any further attention being necessary.

The same general construction and operation may be used in a coupling for electric cables, as shown in Figs. 11 and 12. In this case there is only one socket 7a in the male member 1a for the dowel pin 12a in the female body member 8a. The spaced contacts 25 in the male member are disposed to aline with spring-pressed contacts 26 of conventional form in the member 8a when the dowel alines with said socket.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In a coupling which includes male and female members, a sleeve included with and turnable on the female member, means between the sleeve and male member and functioning upon relative rotation of the sleeve from a predetermined position to engage and hold the members in coupled connection subsequent to an initial engagement of the members with each other, and a spring tending to so rotate the sleeve; means to hold the sleeve against movement from such position and so that the spring is loaded, and means functioning upon such initial engagement of the members to release the holding means.

2. In a coupling which includes male and female members, a sleeve included with and turnable on the female member, means between the sleeve and male member and functioning upon relative rotation of the sleeve from a predetermined position to engage and hold the members in coupled connection subsequent to an initial engagement of the members with each other, and a spring tending to so rotate the sleeve; a spring advanced locking pin mounted with the sleeve, the female member having a socket in position to receive one end of the pin when the sleeve is rotated to load the spring, the sleeve being then in said predetermined position, and means actuated upon initial engagement of the members to retract the pin from said socket.

3. In a coupling which includes male and female members, a sleeve included with and turnable on the female member, means between the sleeve and male member and functioning upon relative rotation of the sleeve from a predetermined position to engage and hold the members in coupled connection subsequent to an initial engagement of the members with each other, and a spring tending to so rotate the sleeve; a spring advanced locking pin mounted with the sleeve axially thereof, the female member having a socket in position to receive one end of the pin when the sleeve is rotated to load the spring and move the sleeve to said predetermined position, and a trigger pin disposed axially of the sleeve and slidably mounted in and projecting from the socket into the path of advancing movement of the female member whereby upon completion of the initial engaging movement of the members the locking pin will be slid along and will force the locking pin from the socket.

4. A coupling comprising male and female members adapted to contact each other at adjacent ends, the male member having a circumferentially extending bayonet slot open to the forward end of the member, means to prevent relative rotation of the members when in contact, a sleeve turnably mounted on the female member to overhang the male member when the latter is in contact with the female member, a radial pin in the sleeve to engage in the slot when the sleeve is in a predetermined position relative to the members, the female member having a circular enlargement intermediate its ends and the sleeve having a transverse wall back of and adjacent said enlargement, a spring between the sleeve and female member back of said wall tending to rotate the sleeve from said predetermined position, a spring-advancing locking pin slidably mounted in the wall and extending axially of the sleeve, the enlargement having a socket facing the wall in the path of the pin to receive the adjacent end of the same when the sleeve is rotated to load the spring, and a trigger pin slidable in the enlargement with one end in the socket and the other end projecting from the forward face of the enlargement for engagement and movement by the male member upon relative movement of the members into contact with each other, to an extent sufficient to retract the locking pin from the socket.

5. A coupling comprising male and female members adapted to contact each other at adjacent ends, the male member having a circumferentially extending bayonet slot open to the forward end of the member, means to prevent relative rotation of the members when in contact, a sleeve turnably mounted on the female member to overhang the male member when the latter is in contact with the female member, a radial pin in the sleeve to engage in the slot when the sleeve is in a predetermined position relative to the members, the female member having a circular enlargement intermediate its ends and the sleeve having a transverse wall back of and adjacent said enlargement, a spring between the sleeve and female member back of said wall tending to rotate the sleeve from said predetermined position, a spring-advancing locking pin slidably mounted in the wall and extending axially of the sleeve, the enlargement having a socket facing the wall in the path of the pin to receive the adjacent end of the same when the sleeve is rotated to load the spring, and a pin releasing element mounted in the enlargement in position to be actuated by the male member upon movement of the latter into contact with the female member.

VERNON C. SMITH.
PAUL E. BOHN.

REFERENCES CITED

The following references are of record in the file of this patent:

UNITED STATES PATENTS

| Number | Name | Date |
|---|---|---|
| 793,869 | Anderson | July 4, 1905 |
| 1,022,624 | Englund | Apr. 9, 1912 |
| 1,857,420 | Wolford | May 10, 1932 |
| 2,087,180 | Bohn | July 13, 1937 |